United States Patent [19]

Oberg

[11] 4,075,361
[45] Feb. 21, 1978

[54] PROCESS FOR PREPARING STABLE FULL FAT OILSEED EXTRACT

[75] Inventor: Elmer B. Oberg, Camarillo, Calif.

[73] Assignee: Paul Taylor Co., Pasadena, Calif.

[21] Appl. No.: 745,488

[22] Filed: Nov. 26, 1976

Related U.S. Application Data

[63] Continuation-in-part of Ser. No. 614,486, Sept. 18, 1975, abandoned.

[51] Int. Cl.² ............................................. A23L 1/20
[52] U.S. Cl. .................................. 426/655; 426/598; 426/431; 426/656; 426/583; 426/629; 426/634; 426/632
[58] Field of Search ............... 426/598, 655, 431, 656, 426/583, 629, 634, 632

[56] References Cited

U.S. PATENT DOCUMENTS

| 1,210,667 | 1/1917 | Mehuish | 426/598 X |
| 1,273,145 | 7/1918 | Burdick et al. | 426/598 |
| 1,359,633 | 11/1920 | Thevenot | 426/655 X |
| 1,444,812 | 2/1923 | Thevenot | 426/598 |
| 2,928,821 | 3/1960 | Chayen | 426/656 X |
| 3,995,071 | 11/1976 | Goodnight et al. | 426/598 |

OTHER PUBLICATIONS

Smith, et al., Soybean or Vegetable Milk, Chemical and Engineering News, vol. 24, No. 1, (1946), pp. 54–56.

Primary Examiner—Joseph M. Golian
Attorney, Agent, or Firm—Christie, Parker & Hale

[57] ABSTRACT

A full fat, stable food material derived from oilseeds is prepared by comminuting oilseeds in the presence of a hot alkaline extraction solution, and then allowing the comminuted seeds to soak in the solution. After neutralizing the solution, the extract is clarified and heated to destroy anti-nutritional factors, concentrated, and spray dried.

53 Claims, 1 Drawing Figure

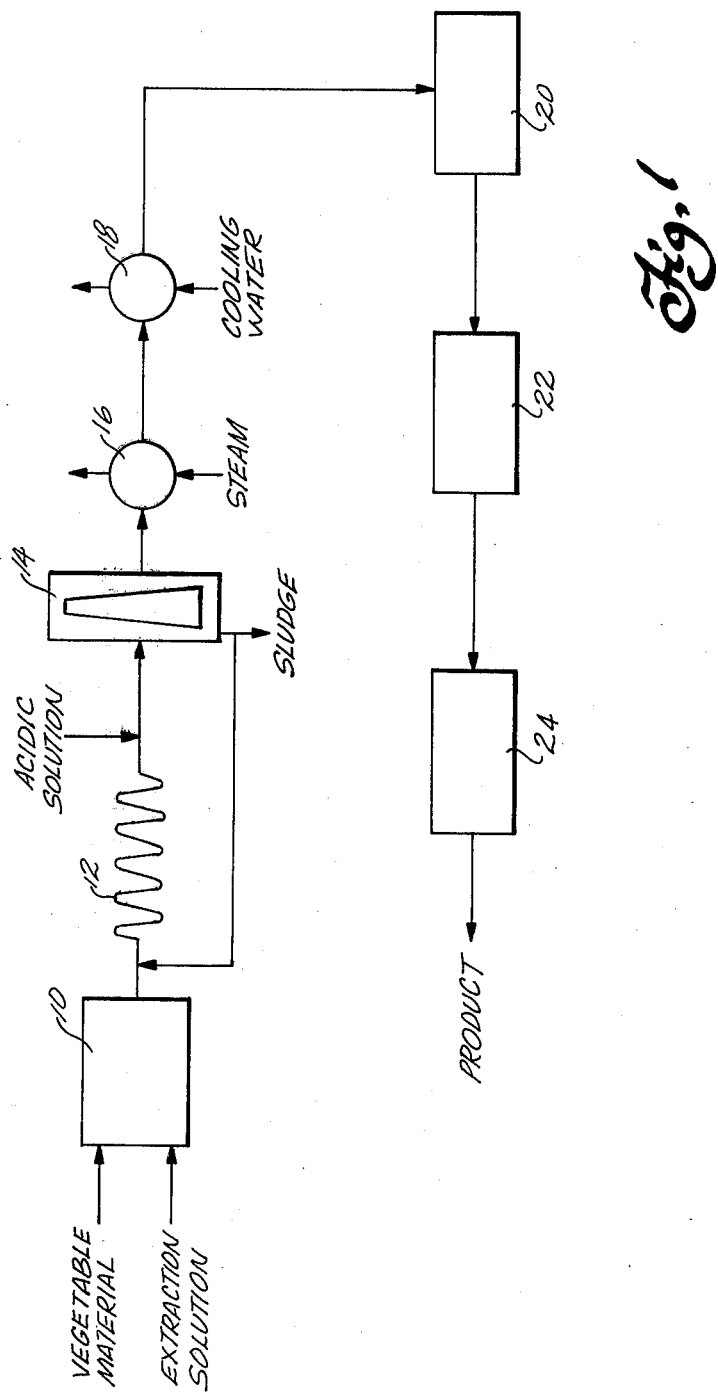

PROCESS FOR PREPARING STABLE FULL FAT OILSEED EXTRACT

CROSS REFERENCE

This application is a continuation-in-part application of my copending application, Ser. No. 614,486, filed on Sept. 18, 1975, and now abandoned.

BACKGROUND OF THE INVENTION

This invention relates to food products, and especially to food products obtainable from oilseeds, as for example, soy beans and peanuts.

Malnutrition due to protein deficiency is a serious problem in many parts of the world. Normally humans indirectly obtain protein from vegetable material by consuming animals which consume the vegetable material. It would be more efficient if it were possible for humans to directly consume more protein in vegetable material without having to rely on animal intermediaries.

To this end, much attention has been directed to soy beans and peanuts as potential protein sources. Ordinarily soy proteins are extracted from fat-free flakes. These fat-free flakes are prepared from whole soy beans by dehulling, rolling and hydrocarbon solvent extracting the soy beans. The extracted flakes are then steamed and heated to remove traces of solvent. The flakes are usually stored until needed for extracting the protein.

Although this hydrocarbon solvent extraction method has achieved commercial success, it is not without disadvantages.

First, since the solvent extracted flakes have a large surface area and usually are stored under uncontrolled temperature and humidity conditions, the flakes may undergo many chemical changes, enzymatic and otherwise, which could lead to undesirable flavors in the flakes themselves and in products made from these flakes. Furthermore, there may be a residual off-flavor due to the hydrocarbon solvent. In addition, the use of hydrocarbon solvents leads to processing difficulties due to the flammable and explosive nature of the solvents and air pollution problems associated with hydrocarbons.

To overcome the disadvantages of hydrocarbon solvent extraction methods researchers have developed water extraction techniques. Chayen, in U.S. Pat. No. 2,928,821 describes a method of producing a protein-lipid complex from vegetable material. This process includes the steps of introducing the vegetable material into a hammermill in the presence of an aqueous liquid carrier, alkylyzing the liquid, and then acidulating the liquid to precipitate the protein-lipid complex. Chayen states that the preferred temperature of the liquid fed into the hammermill is about 45°-55° F.

The Chayen process does overcome some of the disadvantages of the hydrocarbon extraction process. Any residual taste from the hydrocarbons is eliminated.

However, Chayen's process has disadvantages. Only proteins and lipids, but not carbohydrates are recovered from the feed vegetable material. Also, Chayen reports a yield of less than 50% of his protein-fat complex on test with peanuts. Such low yields are of limited commercial value. Furthermore, because of the low temperatures of the Chayen process it is doubtful that lipoxidase and anti-nutritional factors such as anti-trypsin which are in soy beans would be destroyed during the process. In the literature it is stated that the undesirable flavor and odor of soy bean base beverages are probably caused by the enzyme system lipoxidase which catalyzes the oxidation of polyunsaturated oils and fats in the soy beans. The oxidation reaction takes place quickly whenever the bean cell structure is damaged as when the bean cotyledons are bruised, cracked or ground, so that the enzymes and oils are permitted to contact each other.

A high temperature, slightly acidic, aqueous solution extraction process for preparing soy milk from dehulled or presoaked beans is described by Wilkens and Hackler in "Cereal Chemistry," July 1969, Volume 46, No. 4, P. 391.

Because the Wilkens and Hackler process requires that the soy bean feed be either presoaked or dehulled, a facility using this process would have extra operating and capital costs.

The current state of the art is summarized by Smith and Circle in *Soybeans: Chemistry and Technology*, Vol. 1, P. 150, 1972. They state: "the bitter principle, beany taste, and color undoubtedly are the principle obstacles to the use of the soybean as a human food in the United States. Apparently these three problems are still prevalent today since Eley (1968) reports these same problems as the factors limiting the unrestricted use of soybean products in foods. During this 25 year period, many patents granted and papers published pertain to improving the flavor and color of the isolated protein. Seemingly, none of these procedures or processes have completely solved the problem."

Therefore there is a need for an economical process for producing a high protein food product derived from vegetable material which recovers substantially all of the nutritional parts of the vegetable material, and does not use hydrocarbon solvents. The resultant product should be of good initial flavor and be stable with minimal rancidity and minimal flavor development in storage. The product should be essentially free of fiber, and in the case of soy beans, as the source vegetable material, the resultant product should not have a beany flavor. The product also should be water dispersible and compatible with other food materials such as whey, so that it can be combined with these food materials to yield nutritious and palatable food stuffs.

SUMMARY OF THE INVENTION

I have now invented a process for producing an edible extract from oilseeds with the above features. The process is particularly satisfactory when whole soy beans or whole peanuts are the source seed material.

In the first step of process 1 part by weight oilseed is comminuted in the presence of from about 3 to about 15 parts by weight of a hot alkaline extraction solution with a temperature of at least about 180° F to yield an alkaline comminuted oilseed/extraction solution mixture having a sufficiently high pH of at least about 8. Preferably the extraction solution contains sodium hydroxide, and the temperature of the extraction solution is near boiling, i.e., about 205° F. After comminution the oilseed is soaked in the extraction solution for from about 1 to about 20, and preferably from about 3 to about 7 minutes to extract protein, carbohydrates and lipids from the seed material. After the extraction step, the comminuted oilseed/extraction solution mixture is neutralized with an acidic solution, which preferably contains hydrochloric acid. The neutralized mixture is then centrifuged to yield an essentially clear extract and a sludge.

Although the bulk of the anti-nutritional factors in the oilseed is destroyed during the comminution and extraction steps, the clear extract is further treated if necessary by the additional step of heating the extract to a sufficient temperature for a sufficient time, such as to about 285° F for about 15 seconds, to further destroy anti-nutritional factors such as anti-trypsin in the extract.

If a powder product is desired, the extract can be concentrated and spray dried using conventional means to yield a stabilized, full fat, high protein powder. This powder can be instantized using conventional means to improve the powder's dispersibility in aqueous solutions.

The resultant product is a water dispersible food product, which when soy beans are the feed oilseed, contains from about 15 to about 30% lipids and from about 35 to about 55% proteins, where at least about half of the lipids are in the bound form. Nearly all of the soluble portion of the soy bean is recovered, with essentially only the fiber being discarded.

Improved yield may be achieved by extracting with water residual food values which may be in the sludge.

These and other features, aspects and advantages of the present invention will become more apparent from the following drawings, description and appended claims.

DRAWING

The FIGURE shows the steps of a process embodying features of this invention.

DESCRIPTION OF THE INVENTION

Referring to the FIGURE, an oilseed is comminuted in a comminution stage 10 in the presence of an extraction solution.

After comminution, the oilseed is soaked in the extraction solution in an extraction stage and then the comminuted oilseed/extraction solution mixture is neutralized with an acidic solution. After clarification in a clarification stage 14, the extract is heated in a heating stage 16 to destroy anti-nutritional factors and then cooled in a cooling stage 18. To produce a dispersible powder product, the extract from the cooling stage 18 is sent to a concentration stage 20, followed by a spray drying stage 22, and then an instantizing stage 24.

As used herein, the term "comminution" refers to any high speed process of size reduction, including, but not limited to chopping, crushing, tearing, shredding, emulsifying and grinding by suitable machinery.

As used herein, the expression "oilseed" refers to a seed cultivated primarily for its oil content and which also contains a protein dispersible after comminution in an alkaline solution, and the term includes, but is not limited to, soy beans, peanuts, sesame seeds, cotton seeds, and safflower seeds. This process can be used with dehulled soy beans or deskinned peanuts, with or without presoaking. This process also can be used with whole soy beans and whole peanuts which have not been dehulled or presoaked, thereby eliminating the cost of presoaking or dehulling associated with other processes. Also, this process is useful for blends of oilseeds. For example, a blend containing soy beans and peanuts can be treated with this process.

It is preferred that the oilseed be cleaned prior to comminution to remove dirt, insects and other debris. This cleaning can be accomplished by an air stream.

The extraction solution serves to extract carbohydrates, proteins and lipids, also known as fats, from the oilseed.

Sufficient extraction solution having a sufficiently high pH to yield an alkaline oilseed/extraction solution mixture, i.e., a mixture having a pH greater than 7.0, is provided. Because the oilseed/extraction solution mixture generally has a lower pH than the extraction solution by itself, the extraction solution requires a pH of at least about 8, and preferably at least about 9.5 to maintain a safety factor. Generally, the higher the pH of the extraction solution and thus the oilseed/extract solution mixture, the higher the yields obtained from the oilseed. For example, the yield increases from about 61 to about 85% as the pH of the oilseed/extraction solution mixture is increased from about 7 to about 11 when soy beans are used as the oilseed feed. However, at a pH of about 11 of the oilseed/extraction solution mixture, the resultant product has a slight sulfide odor. Thus, the extraction solution is limited to having a pH up to about 13, and more preferably up to about 11. Preferably the extraction solution has a sufficiently high pH of at least about 9.5 to yield an oilseed/extraction solution mixture having a pH from about 8 to about 10, and more preferably from about 8.5 to about 9.

The temperature of the extraction solution is at least 180° F, and preferably near boiling, i.e., about 205° F. Temperatures near boiling serve to destroy the lipoxidase and other heat labile anti-nutritional factors in the oilseed and also drive off volatile components responsible for the beany flavor of soy beans.

From about 3 to about 15 parts by weight of the hot alkaline extraction solution per part oilseed are used. If less than about 3 parts are used it is found that the resulting slurry is too viscous to handle when soy beans are used as the feed. At ratios greater than about 15 the energy requirements become prohibitively expensive in concentrating and spray drying the extract. In addition high levels of extraction solution decrease the yield of the process because oilseed extracts tend to be discarded with the sludge produced in the clarifying stage.

To alkalize the extraction solution any non-toxic chemical which does not irreversibly react with the proteins, carbohydrates, or lipids in the source oilseed may be employed. Such material include sodium and potassium hydroxide, and sodium and potassium carbonate. The preferred chemical is sodium hydroxide because it is inexpensive and readily available.

It is desirable to comminute the oilseed to as fine a particle size as possible. The finer the grind of the material the larger the surface area available for extraction and thus the higher the yield of product. The preferred machinery for comminution is a hammermill, which has been shown to satisfactorily produce a fine grind of oilseed in the presence of the extraction solution. An added advantage of a hammermill is that it tends to aerate the extraction solution. Since the extraction solution is at a high temperature, components of soy beans which tend to give a beany flavor are vaporized and driven off during the comminution operation, thereby reducing the beany flavor of the final product.

The comminution can occur under atmospheric pressure, or in the presence of a vacuum to withdraw the volatile components responsive for the beany flavor of soy bean products. Alternatively, the comminution can be done under pressure followed by venting to release undesirable flavors and odors. Comminution under pressure has the advantage of increasing the boiling point of the extraction solution, thereby permitting more severe treatment during the comminution step.

After comminution, the oilseed is soaked in the extraction solution in the extraction stage 12 for from about 1 to about 20 minutes, and preferably about 3 to about 7 minutes. The purposes of the soaking are to maximize the amount of the nutritional elements extracted from the oilseed feed, to destroy anti-nutritional factors such as anti-trypsin in the seed material, and to destroy lipoxidase. If soaking times less than about 1 minute are used, the yield tends to decrease and there is inadequate destruction of the lipoxidase. If soaking times greater than about 20 minutes are used the product tends to develop an off flavor from hydrolysis of the lipids. Also, higher soaking times require increased capital for larger volume soaking equipment.

The comminuted oilseed/extraction solution mixture is then neutralized with an acidic solution. Any nontoxic acid may be used. However it is preferred to use hydrochloric acid, since it is readily available and inexpensive. The acid solution should be thoroughly mixed with the mixture to prevent insolubilization of protein.

The rest of the process comprises steps for concentrating and stabilizing the extracted carbohydrates, lipids and proteins in the extraction solution. This involves clarifying the neutralized comminuted oilseed/extraction solution mixture in the clarification stage 14. Clarification can be done before neutralization. A centrifuge is useful for accomplishing the clarification step. Sludge, which consists primarily of the fibrous component of the oilseed is the byproduct of the clarification step. However, there are residual extractible lipids, proteins and carbohydrates in the sludge. Therefore the yield of the overall process can be improved by recycling a portion of the sludge to the comminution stage 10 or, as shown in the drawing, to the extraction stage 12 for further extraction.

Alternatively, the sludge can be further extracted in one or more recycle stages where each stage includes the steps of soaking the sludge in water and then clarifying the sludge/water mixture.

If necessary, the clear extract from the clarification stage 14 can be fed to the heating stage 16 to destroy any anti-nutritional factors which were not destroyed by the extraction solution. This is effected by maintaining the clear extract at a sufficiently high temperature for a sufficient time to destroy anti-nutritional factors. Generally the higher the temperature used, the less residence time required in the heating stage. For example, the extract can be maintained at about 285° F for about 15 seconds in the heating stage to destroy anti-nutritional factors. This step may not be required for all types of oilseeds.

The extract is then cooled in the cooling stage 18 to prevent degradation of the seed material extracts. The clear extract can be used directly as product, either alone, or mixed with other liquid sources of nutrients such as whey.

If a product in a powder form is desired, the clear extract from the cooling stage 18 can be sent to the concentration stage 20 and the spray drying stage 22. When the powder is intended to be used with liquids, it can be instantized in the instantizing stage 24.

The above described can be conducted continuously for economies of operation.

The resultant product powder exhibits high stability with minimal rancidity and minimal flavor development in storage. It is essentially free of fiber and beany flavor. It is dispersible in water and compatible with whey and other food materials. When combined with products such as whey, a powder made from soy beans yields a palatable, nutritious milk beverage.

As demonstrated by Example 1 below, when soy beans are used for feed the final product contains from about 15 to about 30% lipids, and from about 35 to about 55% proteins, where at least about half of the lipids are in the bound form. As used herein the term "bound lipids" refers to the percentage of the total lipids in the product which are not extracted by conventional petroleum ether methods. Total lipids are determined by acid hydrolyzing the product before conducting the conventional ether extraction.

The fact that the product of this process has high stability during storage is surprising in light of the commonly held belief that exposing lipids to a hot alkaline solution results in saponification of the lipids. Although not bound by theory I believe that the high stability of the product is due to the high percentage of bound lipids. It appears that the fat particles are encapsulated by a protein derivative during high speed comminution in the presence of the high temperature, high pH extraction solution. It seems that the alkali, rather than hydrolyzing the fat, reacts preferentially with the protein and, in effect, produces a protective colloid for the fat. This could be described as an enrobing or an encapsulating effect.

These and other features of the invention are demonstrated by the following examples.

EXAMPLE 1

Commercial grade whole soy beans were fed to a Fitz mill at 3.3 pounds per minute. The mill was operated with a # IA screen, at an impact forward position. Extraction solution at the rate of 4.0 gallons per minute was fed to the Fitz mill. The extraction solution was prepared by chlorinating 300 gallons of water to 0.01% and adding 1.1 liters of 50% sodium hydroxide to the water. The extraction liquid containing the comminuted soy beans was pumped through 147 feet of 2 inch stainless steel holding tubing giving about 5 minutes residence time to complete the extraction. This liquid had a final temperature of 195° F and a pH of 8.5.

Hydrochloric acid made by diluting concentrated acid 1:15 with water was then metered into the slurry to reduce the pH to 7.0. The slurry was clarified by centrifuging in an Westfalia SAMR-3036 desludger. The sludge was discarded.

The clear extract was pumped through Mallory tubes and heated to 285° F for 15 seconds, and then cooled to 140° F. The liquid was then concentrated to 18 to 20% solids in a Henszy evaporator and spray dried in a Bowen unit using six nozzles at 58/20, an air inlet temperature of 280° F, an air outlet temperature of 170° F, and a spray pressure of 2600 pounds per square inch.

Based on the total soluble solids in the clarified extract, the yield based on the starting beans was 76.1%. The soya powder produced had a good flavor and good wetting characteristics. Analysis of the powder is shown in Table 1.

TABLE 1

| | |
|---|---|
| Protein | 42.51% |
| Lipid | 21.75% |
| Ash | 6.70% |
| Moisture | 4.75% |
| Carbohydrates (by difference) | 24.29% |
| Nitrogen Solubility Index | 82.6% |
| Trypsin Inhibitor Units | 28.76/mg. |

TABLE 1-continued

| Standard Plate Count | 200–550/g. |
| --- | --- |

The lipid content was determined by disintegrating nonfat portions of the sample with hydrochloric acid in the presence of alcohol as a wetting agent to release the fat. The released fat was then extracted utilizing diethyl ether. According to the A.O.C.S. official method Ba 3-38 petroleum ether extraction method the lipid content of the dried product was only 4.35% fat. Thus about 80% of the lipids in the product are bound lipids due to encapsulation by protein derivatives. Since bound lipid contents greater than 75% are associated with high product stability, this high level of bound lipids indicates that the dried product is very stable in storage. The dried product is stable for at least 10 months in storage at room temperature.

Analysis of the whole soy bean feed yielded a 21.6% lipid content using the A.O.C.S. method and 23.6% lipid content using the acid hydrolysis method. This indicates that only about 8% of the feed to the process is sufficiently encapsulated to resist chemical and enzymatic attack during storage.

Some of the product was instantized to produce a more readily dispersible product. The powder was dry blended with 0.3% lecithin, and instantized using a 70/20 nozzle, a feed rate of 5 pounds per minute, a spray pressure 1500 psi, tray temperatures of 260°/180° F, Magnahelics setting of 0.5/0.4 inches, rolls 0.05 inch gap, and a 6 mesh screen. Instantizing reduced the powder density from 0.386 grams per milliliter to 0.232 grams per milliliter.

Some of the spray dried powder was also used to make three beverages by blending the powder in a 1:3 ratio by weight with non-hygroscopic whey, whey protein concentrates, and non-fat dry milk. Each blend was instantized and then tested as a beverage at about 12% solids. All three beverages were found to be acceptable.

EXAMPLE 2

Using the process of Example 1, whole shelled peanuts were successfully treated. The yield was 79.3%.

The present invention has been described with reference to a preferred embodiment. However other versions of this process are equally suitable to practice this invention. Because of these variations of the preferred embodiment which are obvious to one skilled in the art, the spirit and scope of the appended claims should not necesarily be limited to the description of the preferred embodiment.

What is claimed is:

1. A process for preparing a stabilized, full fat, high protein edible extract from an oilseed comprising the steps of:
   a. comminuting 1 part by weight full fat oilseed in the presence of from about 3 to about 15 parts by weight of a hot alkaline extraction solution with a temperature of at least about 180° F and a sufficiently high pH from about 8.0 to about 11 so that the comminuted oilseed/extraction solution mixture is alkaline;
   b. soaking the comminuted oilseed in the extraction solution for from about 1 to about 20 minutes;
   c. neutralizing the comminuted oilseed/extraction solution mixture with an acidic solution;
   d. clarifying the neutralized comminuted oilseed/extraction solution mixture to yield an essentially clear extract and a sludge; and
   e. heating the clear extract to about 285° F to destroy anti-nutritional factors.

2. A process as claimed in claim 1 wherein the extract is maintained at about 285° F for about 15 seconds.

3. A process as claimed in claim 1 comprising the additional steps of concentrating and spray drying the extract to yield a dry powder.

4. A process as claimed in claim 3 comprising the additional step of instantizing the powder.

5. A process as claimed in claim 1 wherein the oilseed is soy beans.

6. A process as claimed in claim 5 comprising the additional step of dehulling the soy beans before comminuting.

7. A process as claimed in claim 1 wherein the extraction solution contains sodium hydroxide.

8. A process as claimed in claim 1 wherein a hammermill is utilized for comminuting the oilseeds.

9. A process as claimed in claim 1 wherein the extraction solution temperature is at least about 205° F.

10. A process as claimed in claim 1 wherein the comminuted oilseed/extraction solution mixture has a pH from about 8 to about 10.

11. A process as claimed in claim 1 wherein the comminuted oilseed/extraction solution mixture has a pH from about 8.5 to about 9.

12. A process as claimed in claim 1 wherein the comminuted oilseed is soaked in the extraction solution for from about 3 to about 7 minutes.

13. A process as claimed in claim 1 wherein the acidic solution contains hydrochloric acid.

14. A process as claimed in claim 1 wherein the step of clarifying comprising the step of centrifuging.

15. A process as claimed in claim 1 comprising the additional step of extracting the sludge in at least one recycle stage which comprises the steps of:
   a. soaking the sludge in water; and
   b. clarifying the sludge/water mixture.

16. A process for preparing a stabilized, full fat, high protein, edible powder from whole soy beans comprising the steps of:
   a. comminuting in a hammermill one part by weight full fat soy bean in the presence of about 3 to 15 parts by weight of a hot alkaline extraction solution which contains sodium hydroxide and has a temperature of at least about 205° F and a sufficiently high pH from about 8 to about 11 that the comminuted soy bean extraction solution mixture is alkaline;
   b. extracting protein, carbohydrates, and lipids from the soy beans by soaking the comminuted soy beans in the extraction solution for from about 3 to about 7 minutes;
   c. neutralizing the comminuted soy bean/extraction solution mixture with an acidic solution containing hydrochloric acid;
   d. centrifuging the neutralized comminuted soy bean/extraction solution mixture to yield an essentially clear extract;
   e. heating the clear extract to about 285° F for about 15 seconds to destroy anti-nutritional factors; and
   f. concentrating and spray drying the extract to yield the stabilized powder.

17. A process for preparing a stabilized, full fat, high protein edible extract from an oilseed comprising the steps of:
  a. comminuting one part by weight full fat oilseed in the presence of from about 3 to about 15 parts by weight of a hot alkaline extraction solution with a temperature of at least about 180° F and a sufficiently high pH from about 8 to about 13 so that the comminuted oilseed/extraction solution mixture is alkaline;
  b. soaking the comminuted oilseed in the extraction solution for from about 1 to about 20 minutes;
  c. neutralizing with an acidic solution and clarifying the comminuted oilseed/extraction solution mixture to yield an essentially clear extract and a sludge; and
  d. heating the clear extract to a sufficient temperature to destroy anti-nutritional factors.

18. A process as claimed in claim 17 wherein the extract is heated to a temperature of about 285° F and maintained at about 285° F for about 15 seconds to destroy anti-nutritional factors.

19. A process as claimed in claim 17 comprising the additional steps of concentrating and spray drying the extract to yield a dry powder.

20. A process as claimed in claim 17 comprising the additional step of instantizing the powder.

21. A process as claimed in claim 17 wherein the oilseed is soy beans.

22. A process as claimed in claim 21 comprising the additional step of dehulling the soy beans before comminuting.

23. A process as claimed in claim 17 wherein the extraction solution contains sodium hydroxide.

24. A process as claimed in claim 17 wherein a hammermill is utilized for comminuting the oilseeds.

25. A process as claimed in claim 17 wherein the extraction solution temperature is at least about 205° F.

26. A process as claimed in claim 17 wherein the comminuted oilseed/extraction solution mixture has a pH from about 8 to about 10.

27. A process as claimed in claim 17 wherein the comminuted oilseed/extraction solution mixture has a pH from about 8.5 to about 9.

28. A process as claimed in claim 17 wherein the comminuted oilseed is soaked in the extraction solution for from about 3 to about 7 minutes.

29. A process as claimed in claim 17 wherein the acidic solution contains hydrochloric acid.

30. A process as claimed in claim 17 wherein the step of clarifying comprises the step of centrifuging.

31. A process as claimed in claim 17 comprising the additional step of extracting the sludge in at least one recycle stage which comprises the steps of:
  a. soaking the sludge in water; and
  b. clarifying the sludge/water mixture.

32. A process for preparing a stabilized, full fat, high protein, edible powder from whole soy beans comprising the steps of:
  a. comminuting in a hammermill one part by weight full fat soy bean in the presence of about 3 to 15 parts by weight of a hot alkaline extraction solution which contains sodium hydroxide and has a temperature of at least about 205° F and a sufficiently high pH from about 9.5 to about 13 that the comminuted soy bean/extraction solution mixture is alkaline;
  b. extracting protein, carbohydrates, and lipids from the soy beans by soaking the comminuted soy beans in the extraction solution for from about 3 to about 7 minutes;
  c. neutralizing the comminuted soy bean/extraction solution mixture with an acidic solution containing hydrochloric acid;
  d. centrifuging the neutralized comminuted soy bean/extraction solution mixture to yield an essentially clear extract;
  e. maintaining the clear extract at about 285° F for about 15 seconds to destroy anti-nutritional factors; and
  f. concentrating and spray drying the extract to yield the stabilized powder.

33. A water dispersible food product derived from whole soy beans comprising lipids and proteins wherein at least about 75% of the lipids are in the bound form and prepared by the process of claim 19.

34. A product produced by the process of claim 19.

35. A process as claimed in claim 17 wherein the extract is heated to a temperature of about 285° F to destroy anti-nutritional factors.

36. A process as claimed in claim 17 wherein the comminuted oilseed/extraction solution mixture has a pH less than about 11.

37. A process as claimed in claim 17 wherein the step of neutralizing occurs before the step of clarifying.

38. A process for preparing a stabilized, full fat, high protein edible extract from an oilseed comprising the steps of:
  a. comminuting one part by weight full fat oilseed in the presence of from about 3 to about 15 parts by weight of a hot alkaline extraction solution with a temperature of at least about 180° F and a pH of at least about 9.5 to yield an alkaline comminuted oilseed/extraction solution mixture having a pH up to about 11;
  b. soaking the comminuted oilseed in the extraction solution for from about 1 to about 20 minutes;
  c. neutralizing with an acidic solution and clarifying the comminuted oilseed/extraction solution mixture to yield an essentially clear extract and a sludge; and
  d. if the clear extract contains anti-nutritional factors destroyable by heat, heating the clear extract to a sufficient temperature to destroy anti-nutritional factors.

39. A process as claimed in claim 38 wherein the extract is heated to a temperature of about 285° F and maintained at about 285° F for about 15 seconds to destroy anti-nutritional factors.

40. A process as claimed in claim 38 comprising the additional steps of concentrating and spray drying the extract to yield a dry powder.

41. A process as claimed in claim 38 comprising the additional step of instantizing the powder.

42. A process as claimed in claim 38 wherein the oilseed is soy beans.

43. A process as claimed in claim 42 comprising the additional step of dehulling the soy beans before comminuting.

44. A process as claimed in claim 38 wherein the extraction solution contains hydroxide.

45. A process as claimed in claim 38 wherein the hammermill is utilized for comminuting the oilseeds.

46. A process as claimed in claim 38 wherein the extraction solution temperature is at least about 205° F.

47. A process as claimed in claim 38 wherein the comminuted oilseed/extraction solution mixture has a pH from about 8 to about 10.

48. A process as claimed in claim 38 wherein the comminuted oilseed/extraction solution mixture has a pH from about 8.5 to about 9.

49. A process as claimed in claim 38 wherein the comminuted oilseed is soaked in the extraction solution for from about 3 to about 7 minutes.

50. A process as claimed in claim 38 wherein the acidic solution contains hydrochloric acid.

51. A process as claimed in claim 38 wherein the step of clarifying comprises the step of centrifuging.

52. A process as claimed in claim 38 comprising the additional step of extracting the sludge in at least one recycle stage which comprises the steps of:
    a. soaking the sludge in water; and
    b. clarifying the sludge/water mixture.

53. A process for preparing a stabilized, full fat, high protein, edible powder from whole soy beans comprising the steps of:
    a. comminuting in a hammermill one part by weight full fat soy bean in the presence of about 3 to 15 parts by weight of a hot alkaline extraction solution which contains sodium hydroxide and has a temperature of at least about 205° F and a pH of at least about 9.5 to yield an alkaline comminuted soy bean/extraction solution mixture having a pH up to about 11;
    b. extracting protein, carbohydrates, and lipids from the soy beans by soaking the comminuted soy beans in the extraction solution for from about 3 to about 7 minutes;
    c. neutralizing the comminuted soy bean/extraction solution mixture with an acidic solution containing hydrochloric acid;
    d. centrifuging the neutralized comminuted soy bean/extraction solution mixture to yield an essentially clear extract;
    e. maintaining the clear extract at about 285° F for about 15 seconds to destroy anti-nutritional factors; and
    f. concentrating and spray drying the extract to yield the stabilized powder.

* * * * *

UNITED STATES PATENT AND TRADEMARK OFFICE
CERTIFICATE OF CORRECTION

PATENT NO. : 4,075,361
DATED : February 21, 1978
INVENTOR(S) : Elmer B. Oberg

It is certified that error appears in the above-identified patent and that said Letters Patent are hereby corrected as shown below:

In the specification:

Column 4, line 45, "material" should be -- materials --.

Column 8, line 37, "comprising" should be -- comprises --.

Column 10, line 64, -- sodium -- should be inserted after "contains" and before "hydroxide".

Signed and Sealed this

Twenty-seventh Day of June 1978

[SEAL]

Attest:

RUTH C. MASON
Attesting Officer

DONALD W. BANNER
Commissioner of Patents and Trademarks